Figure 1:
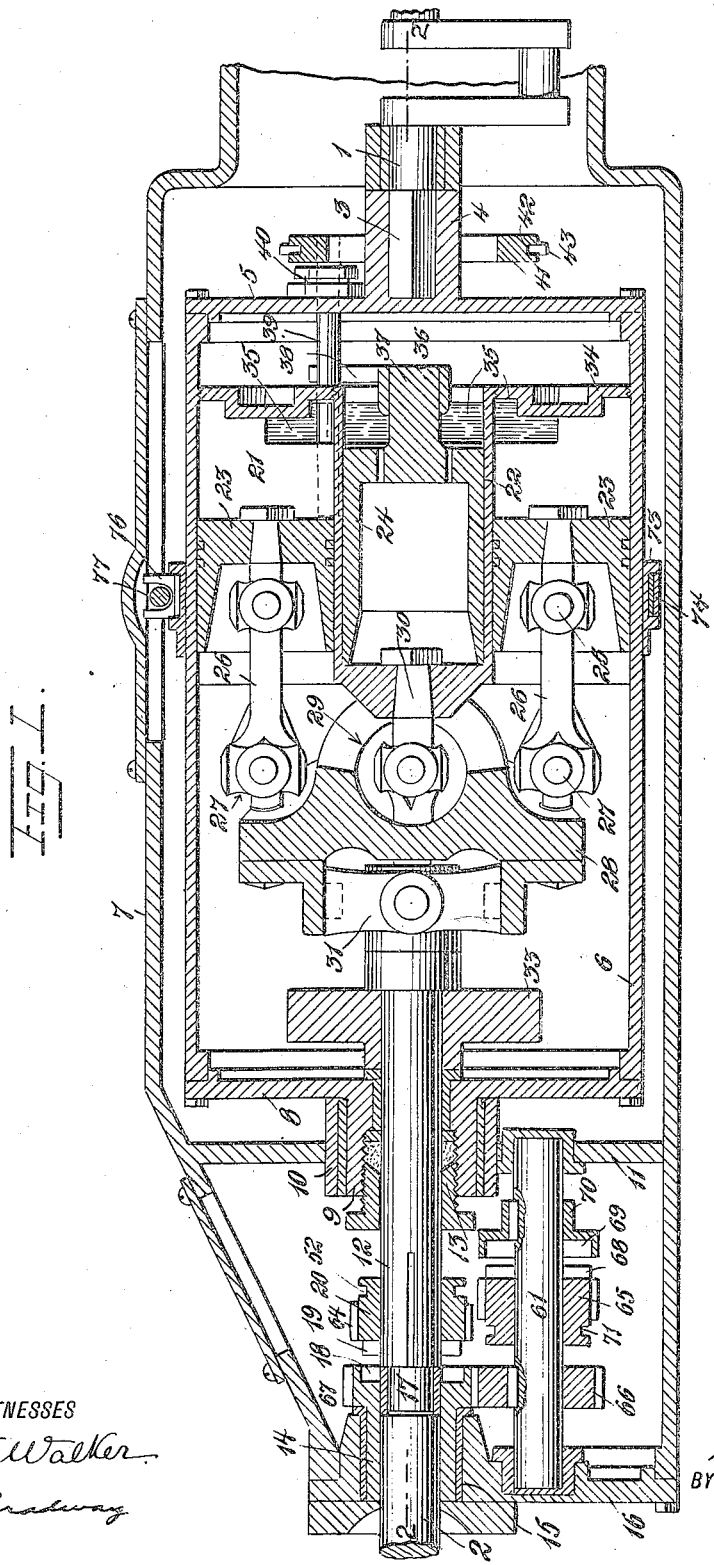

S. V. DICKMAN.
SPEED CHANGING TRANSMISSION MECHANISM AND BRAKE.
APPLICATION FILED SEPT. 26, 1917.

1,296,371.

Patented Mar. 4, 1919.
3 SHEETS—SHEET 1.

WITNESSES
H. T. Walker
C. Bradway

INVENTOR
S. V. Dickman.
BY Munn & Co
ATTORNEYS

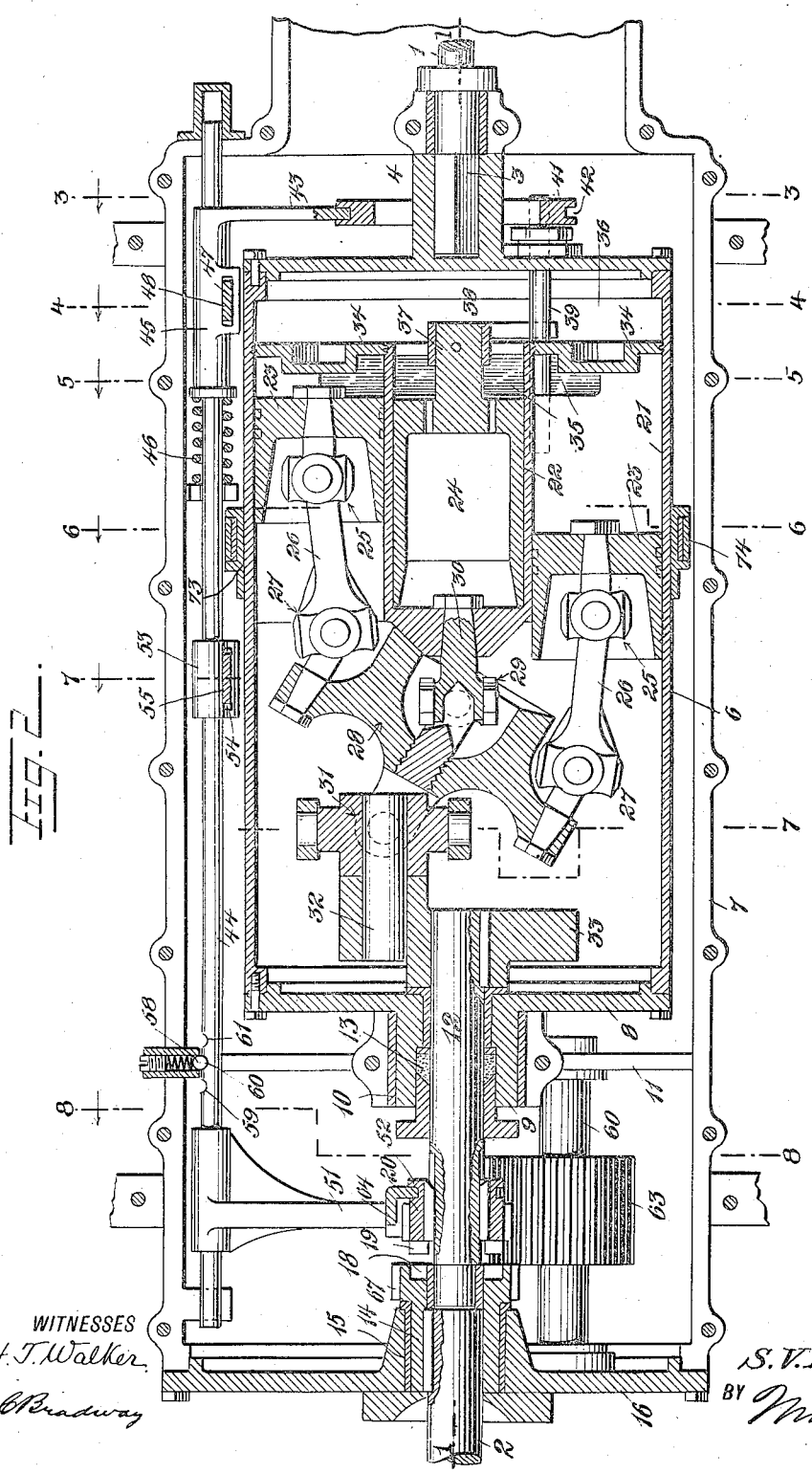

S. V. DICKMAN.
SPEED CHANGING TRANSMISSION MECHANISM AND BRAKE.
APPLICATION FILED SEPT. 26, 1917.
1,296,371.
Patented Mar. 4, 1919.
3 SHEETS—SHEET 3.
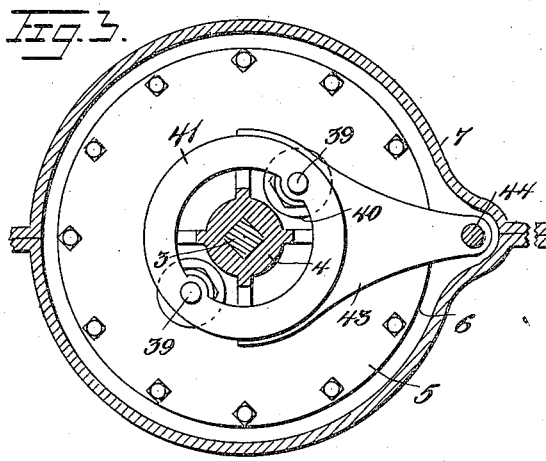
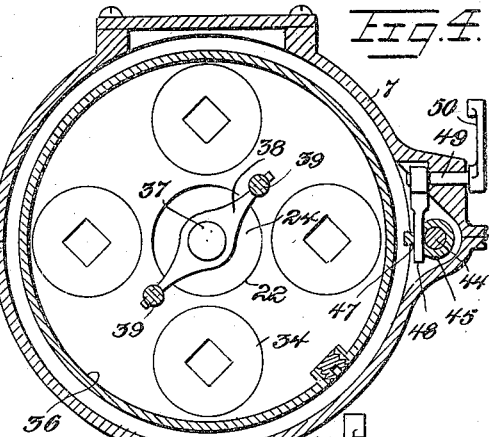
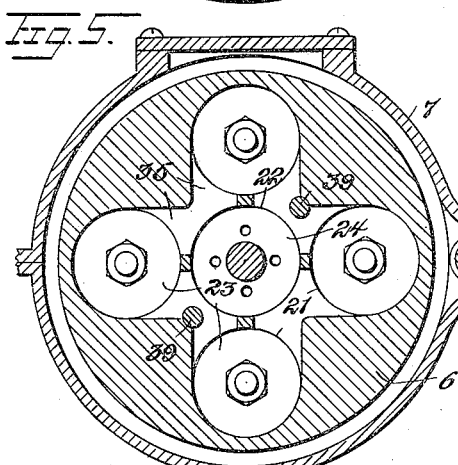
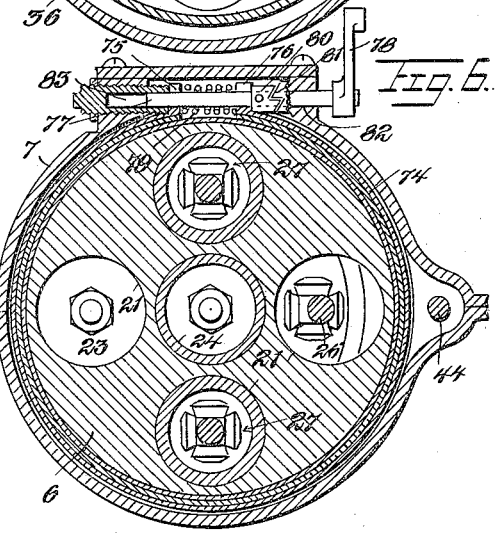
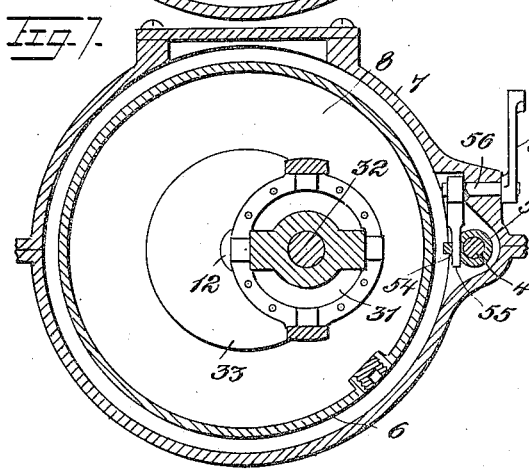
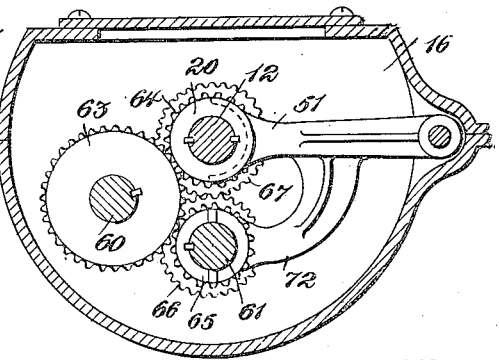
WITNESSES
H. J. Walker
C. Brodway
INVENTOR
S. V. Dickman.
BY Munn & Co.
ATTORNEYS

UNITED STATES PATENT OFFICE.

SMITH V. DICKMAN, OF SHAVERTOWN, NEW YORK.

SPEED-CHANGING TRANSMISSION MECHANISM AND BRAKE.

1,296,371. Specification of Letters Patent. Patented Mar. 4, 1919.

Application filed September 26, 1917. Serial No. 193,320.

*To all whom it may concern:*

Be it known that I, SMITH V. DICKMAN, a citizen of the United States, and a resident of Shavertown, in the county of Delaware and State of New York, have invented a new and Improved Speed-Changing Transmission Mechanism and Brake, of which the following is a full, clear, and exact description.

This invention relates to a power transmission speed changing mechanism and brake device especially adapted for use in automobiles, aeroplanes or other power-driven vehicles or similar machines, and the invention has for its general objects to improve the construction and operation of apparatus of this character so as to be reliable and efficient in use, easily controlled, and so designed as to transmit power from a motor or driving shaft to a driven shaft without appreciable loss, and to permit the operator to readily vary the speed of the driven shaft to any desired degree without changing that of the motor.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a vertical longitudinal sectional view of the apparatus;

Fig. 2 is a horizontal section thereof; and

Figs. 3 to 8 inclusive are transverse sections taken respectively on the lines 3—3 to 8—8, inclusive, Fig. 2.

Referring to the drawings, 1 designates a driving element which may be a crank shaft of an engine, and 2 is the driven shaft which is located at the opposite end of the apparatus from the crank shaft and in axial alinement therewith. The driving shaft 1 has a non-circular end 3 fitted in a socket 4 on the head 5 of a drum 6, which latter is arranged within a stationary housing or casing 7. The head 8 of the drum has a hollow journal 9 rotatable in a bush bearing 10 carried by the partition 11 of the casing 7, whereby the drum is rotatably mounted in the latter. Passing through the journal 9 is a transmission shaft 12 in alinement with the driven shaft 2, and a stuffing box 13 is provided in the journal 9 to prevent leakage along the shaft 12 of a hydraulic medium which fills the space within the drum. The driven shaft 2 is keyed to a sleeve 14 which is rotatable in a bearing 15 in the end wall 16 of the housing or casing 7, and the outer end 17 of the transmission shaft 12 is also journaled in the sleeve 14. The sleeve 14 constitutes one member of a clutch and has teeth or recesses 18 with which teeth 19 on a slidable member 20 feathered to the shaft 12 are adapted to engage. When the clutch element 20 is moved into engagement with the clutch element or sleeve 14 the transmission shaft 12 will be directly connected with the driven shaft for forward rotation of the latter.

Within the drum 6 is a hydraulic device which, in the present instance, embodies four parallel cylinders 21 arranged about a central valve cylinder 22, and in the cylinders 21, which are fixed in the drum or carried by the circumferential wall thereof, are reciprocatory pistons 23, while in the cylinder 22 is a reciprocatory valve 24. The pistons 23 are connected by universal joints 25 with links 26 which are in turn connected by universal joints 27 with a disk or wabbler 28. This disk 28 oscillates or wabbles on a universal joint 29 carried by a fixed central pin 30. The center of the disk 28 is connected by a universal joint 31 with a crank pin 32 carried by a crank disk 33 on the end 12 of the transmission shaft which extends into the drum 6. The piston cylinders 21 are closed by heads 34, and the piston cylinders are provided with ports or passages 35 which communicate through the valve cylinder 22 with the chamber 36 formed at the right end of the drum 6. The central valve 24, which is common to all the ports 35, is adapted to regulate the effective area of communication between the piston cylinders 21 and the chamber 36 for controlling the inflow and outflow of the hydraulic medium.

The controlling valve 24 has a stem 37 provided with cross arms 38 which are connected with parallel members 39 slidable through stuffing boxes 40 in the head 5, and these members are connected with a ring 41 which surrounds the hub or socket 4 on the head 5. The ring 41 has a circumferential groove 42 into which engages a fork 43 which is slidable on a shifting rod 44 that extends longitudinally of the housing 7 in parallel relation to the axis of the apparatus. The fork 43 is carried by a sleeve 45 which is backed by a spring 46 on the rod 44, and, as shown in Fig. 4, the sleeve has a slot 47 into which engages an arm 48 on a shaft 49 that is journaled in the side of the casing 7, and on this shaft is an arm 50 which is adapted to be connected with a lever, pedal or the like, so that the operator can shift the fork 43 to change the position of the controlling valve 24.

When the parts of the hydraulic transmission device are in the position shown in Figs. 1 and 2, that is to say, with the valve 24 open and the ports 35 unrestricted, the rotation of the driving shaft 1 does not cause any transmission of power; the drum 6 rotates; the disk 28 rotates and oscillates, and the pistons 23 reciprocate, but the hydraulic medium is free to pass into and out of the cylinders 21 without offering resistance, so that the shaft 2 and the crank pin 32 will be stationary, but when the valve is moved to more or less close the ports 35, resistance is interposed, thus slowing down the action of the pistons, which in turn slow down the rocking motion of the disk 28, so that the rotation of the drum 6 and disk 28 will in turn cause the crank pin 32 to revolve at a speed ratio depending upon the position of the controlling valve 24. If the valve is fully closed there will be a one-to-one speed ratio between the driving shaft 1 and the transmission shaft 12.

To transmit power to the driven shaft 2 from the transmission shaft 12, the clutch member 20 must be moved to the left. For this purpose a fork 51 is mounted on the shifting rod 44 and engages a peripheral groove 52 in the clutch element 20. On the shifting rod 44 is a sleeve 53 which has a slot 54 into which engages the lower end of an arm 55 on a shaft 56 that is journaled in the side of the casing 7 and carries an outer arm 57 which is connected with some suitable means under the control of the operator, so that the shifting rod 44 can be moved longitudinally from the neutral position shown in Fig. 2 to the right or left. A spring-pressed ball 58, Fig. 2, is adapted to engage in any one of the recesses 59, 60 and 61 in the shifting rod to hold the same in any one of its three positions. When the yielding stop or catch 58 engages in the recess 60 the shifting rod is in neutral position and the clutch teeth 18 and 19 are disengaged, which means that the driven shaft is disconnected from the transmission shaft. When the shifting rod is moved to the left so that the spring-pressed ball or catch engages in the recess 61, the clutch teeth 18 and 19 are engaged, so that the transmission shaft 12 is operatively connected with the driven shaft 2. When the shifting rod 44 is moved to the right and the catch 58 engages the recess 59 the transmission shaft will be connected through reversing gearing shortly to be explained, with the driven shaft 2 to reverse the same.

The reversing gearing embodies countershafts 60 and 61, on the first of which is a large gear wheel 63 with which constantly mesh gear teeth 64 on the clutch element 20, and on the countershaft 61 is a gear wheel 65 which is in permanent mesh with the gear 63. The gear 65 is loose on the countershaft 61, whereas on the latter is keyed a gear wheel 66 which is in permanent mesh with gear teeth 67 on the sleeve 14, which is in turn keyed to the driven shaft 2. The gear 65 is a clutch element and is provided with clutch teeth 68 that are adapted to mesh with clutch teeth 69 of a clutch element 70 keyed to the secondary shaft 61. The gear or clutch element 65 has a annular groove 71 into which engages a fork 72 carried by the fork 51, so that by moving the shifting rod 44 to the right, the clutch teeth 68 and 69 are engaged so as to connect the transmission shaft 12 to the driven shaft 2 for reversing the direction thereof, while the driving shaft 1 is required to rotate in but one direction.

The braking is effected by arresting the drum 6. Surrounding the drum and carried fixedly thereby is a brake ring 73 in which engages a lined brake band 74, Figs. 1, 2 and 6. The ends of the brake band terminates in lugs 75 and 76 through which extends a rock shaft 77 that has an operating crank 78 on one end. Between the lugs 75 and 76 and surrounding the shaft 77 is a spring 79 which tends to hold the brake band open. A cam 80 fastened to the shaft 77 engages a fixed cam 81, so that by turning the rock shaft 77 the latter is moved longitudinally in its bearings 82 and 83 so as to cause the brake band to tighten and thereby prevent rotation of the drum 6, whereby the vehicle is stopped or its speed slackened. The bearing 83 is threaded in the casing 7 so as to be adjustable to compensate for wear on the brake band. When the vehicle is running and the ignition system of the engine is open-circuited, the brake band can be tightened so that the driven shaft 2 becomes the driver and causes the hydraulic transmission device to act as a brake to slow down the vehicle.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. A mechanism of the class described comprising a driving shaft, a rotatable structure connected therewith, and including a central cylinder closed at one end and a plurality of cylinders around the central cylinder and each having a closed end, a chamber between one end of the structure and the ends of the cylinders and communicating with all the cylinders and containing a hydraulic medium, solid headed pistons reciprocating in the outer cylinders, an axially movable valve in the central cylinder for controlling communication between the said chamber and the pistons, and means connected with the valve and extending to a point outside the chamber for operating the valve.

2. A mechanism of the class described comprising a driving shaft, a drum connected with and rotated by the shaft, a chamber in the drum for holding a hydraulic medium, piston cylinders in the drum and communicating with the chamber, a valve for opening and closing communication between the cylinders and chamber, means outside the drum and connected with the valve for operating the same, pistons in the said piston cylinders, a transmission shaft extending into the drum and having a crank pin rotating about an axis parallel with the axes of the piston cylinders, and driving connections between the said pistons and crank pin.

3. A mechanism of the class described comprising a driving shaft, a drum connected with and rotated by the shaft, cylinders in the drum arranged around a common axis and in parallel relation thereto, solid headed pistons in the cylinders, a central valve cylinder closed at one end, a reservoir associated with the cylinders and having communication with each piston cylinder, a valve in the central cylinder for controlling communication between the said reservoir and the piston cylinders, means operated by the pistons, an axially movable ring mounted outside the drum and connected with the valve, and a shifter engaged with the ring for moving the same.

4. A mechanism of the class described comprising a driving shaft, a drum rotated thereby, piston cylinders in the drum, a chamber for containing a hydraulic medium, passages between the chamber and cylinders, a valve disposed centrally of the cylinder and movable axially, means connected with the valve and extending out of the drum, a shifting device connected with the said means for moving the valve, pistons in the cylinders, a wabbling element disposed in the drum, a universal joint on which the element is mounted, a plurality of links, universal joints between the links and element and pistons, a crank pin in the drum, a universal joint between the crank pin and said element, and a transmission shaft driven by the said element.

SMITH V. DICKMAN.